United States Patent
Drobychev et al.

(10) Patent No.: US 8,918,555 B1
(45) Date of Patent: Dec. 23, 2014

(54) ADAPTIVE AND PRIORITIZED REPLICATION SCHEDULING IN STORAGE CLUSTERS

(71) Applicant: Google Inc., Mountain View, CA (US)

(72) Inventors: Alexandre Drobychev, San Mateo, CA (US); Michael O'Reilly, Pyrmont (AU)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/669,596

(22) Filed: Nov. 6, 2012

(51) Int. Cl.
G06F 3/00 (2006.01)
G06F 13/00 (2006.01)
G06F 13/38 (2006.01)

(52) U.S. Cl.
USPC .................................. 710/33; 710/15; 710/62

(58) Field of Classification Search
None
See application file for complete search history.

(56) References Cited

U.S. PATENT DOCUMENTS

2007/0112897 A1* 5/2007 Asano et al. .................. 707/204

OTHER PUBLICATIONS

Kellerer et al., "Knapsack Problems", Feb. 20, 2004, 1 page. (Abstract Only).
Hu et al., "Combinatorial Algorithms", Apr. 15, 2002, 1 page. (Abstract Only).

* cited by examiner

*Primary Examiner* — Zachary K Huson
(74) *Attorney, Agent, or Firm* — Morgan, Lewis & Bockius LLP

(57) ABSTRACT

In one implementation, groups of objects may be maintained, each group including one or more objects that are to be replicated at one or more of the storage clusters. The objects may be assigned to the groups based on replication choices where at least some of the objects are assigned to multiple ones of the groups. A priority value may be determined and associated with each of the groups, the priority value of a particular group being determined based on priority values associated with objects within the particular group. The objects may be selected, for replication, in a replication order based on the priority value of the groups and replication of the selected objects may be initiated.

21 Claims, 10 Drawing Sheets

ADAPTIVE AND PRIORITIZED REPLICATION SCHEDULING IN STORAGE CLUSTERS

BACKGROUND

Distributed storage clusters may be built of commodity computers that can deliver high performance, availability, and scalability for data-intensive applications at a reduced cost compared to monolithic disk arrays. Storage clusters may achieve high availability and durability by storing multiple replicas of every object. The locations of those replicas may be constrained by many factors, such as object policy requirements, object access patterns, and dynamic characteristics of the storage system (such as capacities and performance of locations and network links). Due to variability of these factors, a storage system, that uses storage clusters, may have to periodically change replica locations of some objects by performing replications from an existing location to a new one. In some distributed storage systems, the number of objects that require replication, at any given moment, may be large.

SUMMARY

According to some possible implementations, a method performed by one or more devices may include maintaining, by at least one of the one or more devices, a number of groups of objects, each group including one or more objects, associated with priority values that are to be replicated at one or more storage clusters, each group, of the number of groups, being associated with a set of replication choices describing how the objects in the group are to be replicated, the set of replication choices including information defining a source storage cluster, a destination storage cluster, and a channel between the source storage cluster and the destination storage cluster. The method may further include associating, by at least one of the one or more devices, maximum sending capacity values with the storage clusters; associating, by at least one of the one or more devices, maximum receiving capacity values with the storage clusters; associating, by at least one of the one or more devices, a group priority value with each of the groups, the group priority value being selected as a highest priority value associated with the one or more objects in each of the groups; scheduling, by at least one of the one or more devices, the one or more objects, for replication, in a replication order based on the group priority values, the maximum sending capacity values, and the maximum receiving capacity values; and initiating, by at least one of the one or more devices, replication of the one or more objects based on the scheduled replication order.

Consistent with the first implementation, the method may further include associating maximum channel capacity values with channels between the sources and the destination storage clusters, where scheduling the one or more objects, for replication, is based additionally on the maximum channel capacity values.

Consistent with the first implementation, the method may further include receiving confirmation that the initiated replication has completed; forming, based on the source storage cluster and the destination storage cluster corresponding to the completed replication, a list of candidate source storage cluster, destination storage cluster, and channel triplets; and scheduling, based on the list, additional ones of the one or more objects for replication.

Consistent with the first implementation, at least some of the one or more objects may be associated with sets of replication choices, and the method may further include including the at least some of the one or more objects in multiple ones of the groups of objects.

In a second implementation, a system may include a number of storage clusters to store objects; and one or more computing devices to schedule replication of the objects, corresponding to priority values, among the storage clusters, replication of each of the objects being associated with one or more sets of replication choices that define replication parameters for the objects. The one or more computing devices may: assign the objects to groups based on the replication choices for the objects, at least some of the objects being assigned to multiple groups in the groups; determine priority values, associated with each of the groups, the priority value of a particular group, of the groups, being determined based on the priority values associated with objects within the particular group; select objects for replication, in a replication order based on the priority values of the groups; and initiate replication of the selected objects by the storage clusters.

Consistent with the second implementation, the one or more computing devices may further associate maximum sending capacity values with the storage clusters; associate maximum receiving capacity values with the storage clusters; where selecting the objects for replication, may be performed in a replication order that is additionally based on the maximum sending capacity values and the maximum receiving capacity values.

Consistent with the second implementation, the one or more channels may couple the storage clusters to one another. The one or more computing devices may be further to: associate maximum channel capacity values with the one or more channels, where selecting the objects, for replication, may be performed in a replication order that is additionally based on the maximum channel capacity values.

Consistent with the second implementation, the one or more computing devices may be further to: determine the priority value of the particular group as a highest priority value associated with all the objects within the particular group.

Consistent with the second implementation, the one or more computing devices may be further to: sort the groups based on the determined priority values, where selecting the objects for replication is based additionally on the sorted groups.

Consistent with the second implementation, the one or more computing devices may be further to: form the groups based on common source storage cluster, destination storage cluster, and channel triplets that are associated with the objects.

Consistent with the second implementation, the one or more computing devices may be further to: receive confirmation that an initiated replication, of a selected object, has completed; form, based on a source storage cluster and a destination storage cluster corresponding to the selected object, a list of candidate source storage cluster, destination storage cluster, and channel triplets; and where the selecting, based on the list, additional includes selecting ones of the objects for replication.

Consistent with the second implementation, the storage clusters may be geographically distributed.

In a third implementation, a method may be performed by one or more devices and may include maintaining, by at least one of the one or more devices, groups of objects, each group including one or more objects, associated with priority values and that are to be replicated at one or more storage clusters in the storage clusters, replication of each of the objects being associated with one or more sets of replication choices that define replication parameters for the objects. The method may further include assigning, by at least one of the one or more devices, the objects to groups based on the replication choices for the objects, at least some of the objects being assigned to multiple groups of the groups; determining, by at least one of the one or more devices, priority values associated with each of the groups, the priority value of a particular group being determined based on priority values associated with objects within the particular group; selecting, by at least one of the one or more devices, objects for replication, in a replication order based on the priority values of the groups; and initiating, by at least one of the one or more devices, replication of the selected objects by the storage clusters.

Consistent with the third implementation, the method may further include associating maximum sending capacity values with the storage clusters; associating maximum receiving capacity values with the storage clusters; where selecting the objects for replication are performed in a replication order that is additionally based on the maximum sending capacity values and the maximum receiving capacity values.

Consistent with the third implementation, the method may further include associating maximum channel capacity values with the one or more channels; where selecting the objects for replication, are performed in a replication order that is additionally based on the maximum channel capacity values.

Consistent with the third implementation, the method may further include determining the priority value of the particular group as a highest priority value associated with all the objects within the particular group.

Consistent with the third implementation, the method may further include sorting the groups based on the determined priority values, where selecting the objects for replication is based additionally on the sorted of groups.

Consistent with the third implementation, the method may further include forming the groups based on common source storage cluster, destination storage cluster, and channel triplets that are associated with the objects.

Consistent with the third implementation, the method may further include receiving confirmation that an initiated replication, of a selected object, has completed; forming, based on a source storage cluster and a destination storage cluster corresponding to the selected object, a list of candidate source storage cluster, destination storage cluster, and channel triplets, where the selecting, based on the list, additional includes ones of the objects for replication.

Consistent with the third implementation, the storage clusters may be geographically distributed.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Overview

Figure 1:
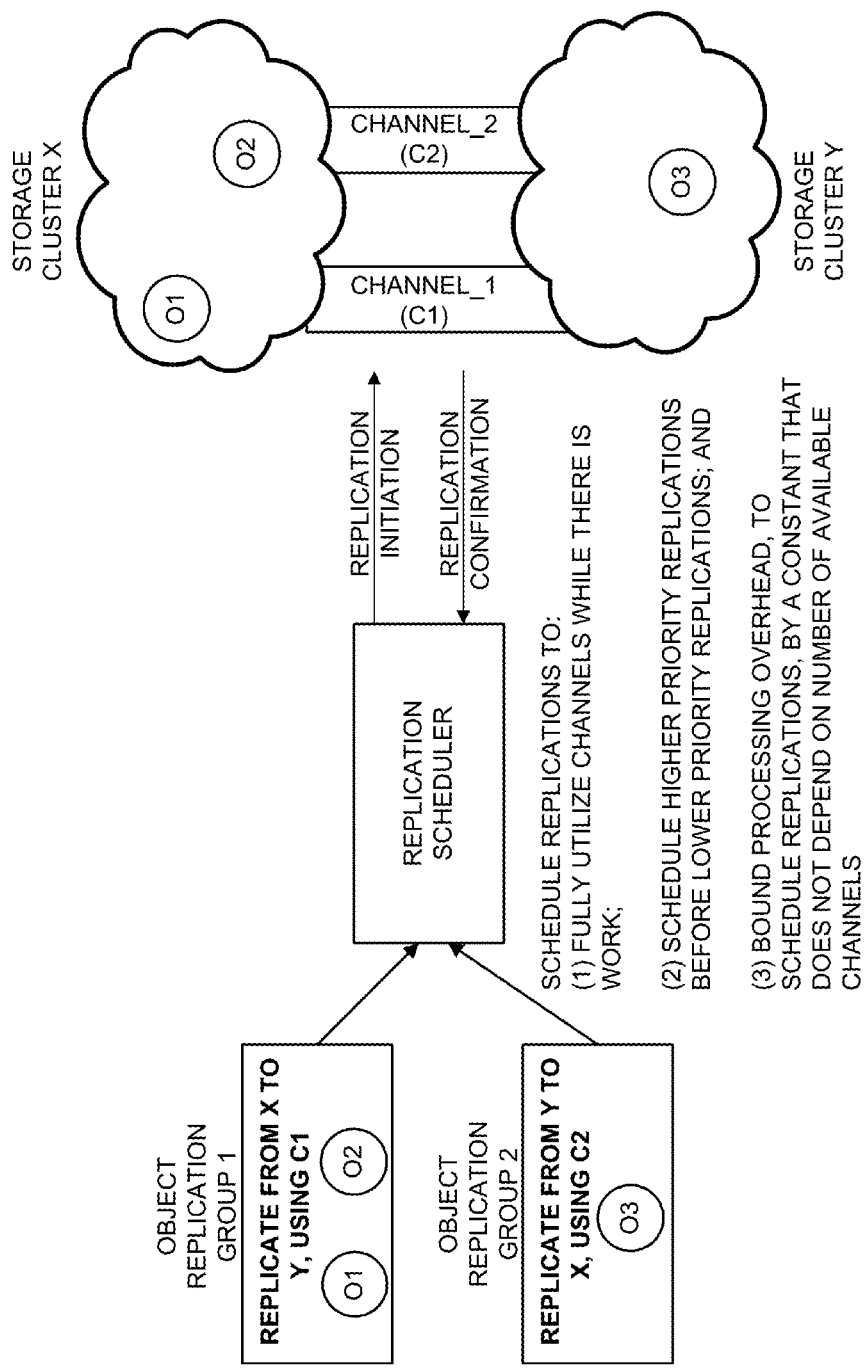
FIG. 1 is a diagram conceptually illustrating the operation of an example distributed file system that includes storage clusters.

FIG. 1 is a diagram conceptually illustrating the operation of an example distributed file system. In this example, two storage clusters, labeled as storage clusters X and Y, are illustrated. Each storage cluster may include one or more computing and/or storage devices that store and provide data as part of a distributed file system. For example, a storage cluster may be formed from a number of computing devices, connected in a local network, where each computing device may control a number of hard disk drives. Data may be stored in the storage clusters in discrete units, referred to as objects herein. As illustrated, storage cluster X may include objects O1 and O2 and storage cluster Y may include the object O3. Communication channels, C1 and C2, may connect storage clusters X and Y and may be used to replicate objects between storage clusters X and Y.

Objects in one of storage clusters X or Y may occasionally be copied (replicated) to the other one of storage clusters X or Y. Each object that is to be replicated may be associated with one or more parameters, called replication choices herein, that describe options relating to how the object may be replicated. A set of replication choices may include, for example, information identifying a source storage cluster for the object, information identifying a destination storage cluster for the object, information identifying a channel between the source and destination storage cluster over which the replication may occur, and a priority associated with the replication.

The quantity of objects that are queued for replication, at any given moment, may be large. The distributed file system may make the replication processing more manageable by organizing the objects for replication into object replication groups. Each object replication group may include one or more objects that have the same set or sets of replication choices. For example, an object replication group may be defined for all objects that are to be replicated, from a particular storage cluster, and that have the same object replication policy.

Two object replication groups are illustrated in FIG. 1: object replication group 1, which includes the objects O1 and O2, and object replication group 2, which includes the object O3. All objects in replication group 1 may be replicated from storage cluster X to storage cluster Y, using channel C1.

Similarly, all objects in replication group 2 may be replicated from storage cluster Y to storage cluster X, using channel C2.

At any given time, the quantity of replications that are waiting to be performed may be larger than the available resources of the distributed file system that are devoted to replications. Consistent with aspects described herein, replications may be scheduled, from available object replication groups, in a manner that takes into account assigned replication priorities and adapts to changing resource conditions in the distributed file system.

As shown in FIG. 1, a replication scheduler may schedule objects from replication groups 1 and 2 to be replicated in the storage clusters. Scheduling an object for replication, by the replication scheduler, may include dispatching or initiating replication of the object between the storage clusters. The replication scheduler may receive confirmation (also called acknowledgements) of the success or failure of each replication. The objects may be scheduled by choosing the objects, from the replication groups, to: (1) fully utilize the available capacity of the channels while there remains work (e.g., objects to be replicated); (2) schedule higher priority replications before lower priority replications; and (3) bound the processing overhead required to schedule the replicas by a constant that does not depend on the number of available channels. The operation of the replication scheduler will be described in more detail below.

Example Storage Cluster Configuration

Figure 2:
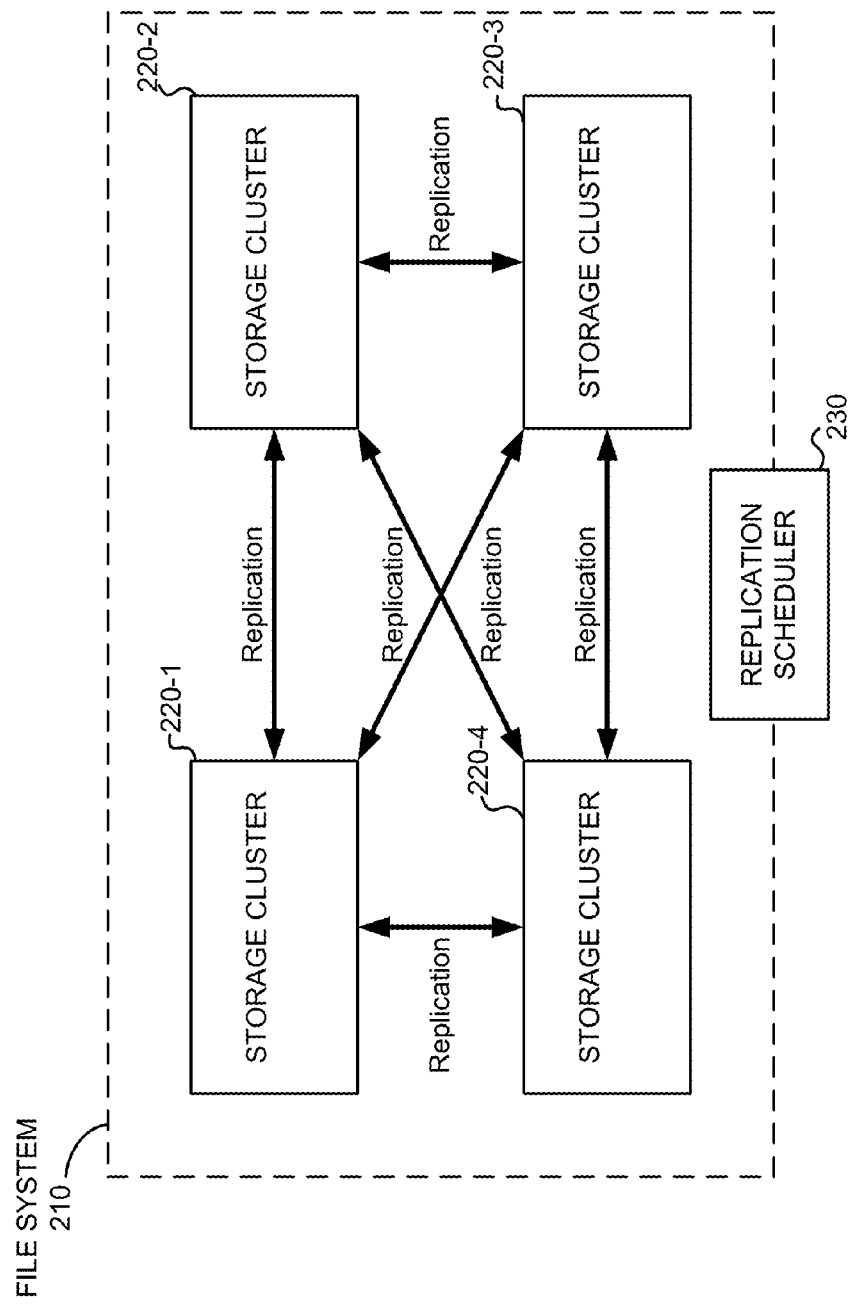
FIG. 2 is a diagram of an example configuration of a distributed file system that includes storage clusters.

FIG. 2 is a diagram of an example configuration of a distributed file system 210 that includes storage clusters. As shown in FIG. 2, file system 210 may include storage clusters 220-1, 220-2, 220-3, and 220-4, and replication scheduler 230.

Storage clusters 220-1, 220-2, 220-3, and 220-4 may be located at different geographical locations and connected to one another via one or more networks. Data may be replicated across storage clusters 220-1, 220-2, 220-3, and 220-4, to increase data availability and reduce network distance from clients. Generally, objects may be dynamically created, replicated, and/or deleted in different storage clusters 220. Although four storage clusters 220 are shown in FIG. 2, file system 210 may generally include any number of storage clusters 220.

Each storage cluster 220 may include one or more server devices, or other types of computation or communication devices, that may store, process, search, and/or provide information in a manner described herein. In some implementations, each storage cluster 220 may include one or more server devices capable of maintaining a large-scale, random read/write-access data store for data structures, such as files, that may be used to implement the objects for storage cluster 220.

Replication scheduler 230 may be associated with file system 210 and may include, for example, one or more server devices, or other types of computation or communication devices, that act to schedule replications in file system 210. In some implementations, replication scheduler 230 may implement policies to automatically determine when objects, in file system 210, are to be replicated. Alternatively or additionally, replication scheduler 230 may receive indications that particular objects are to be replicated from another source, such as from a device external to file system 210.

Although FIG. 2 shows example components of a file system, in other implementations, the file system may contain fewer, additional, different, or differently arranged components than depicted in FIG. 2. In still other implementations, one or more components of the file system may perform one or more tasks described as being performed by one or more other components of the file system.

Object Replica Scheduling

Figure 3:
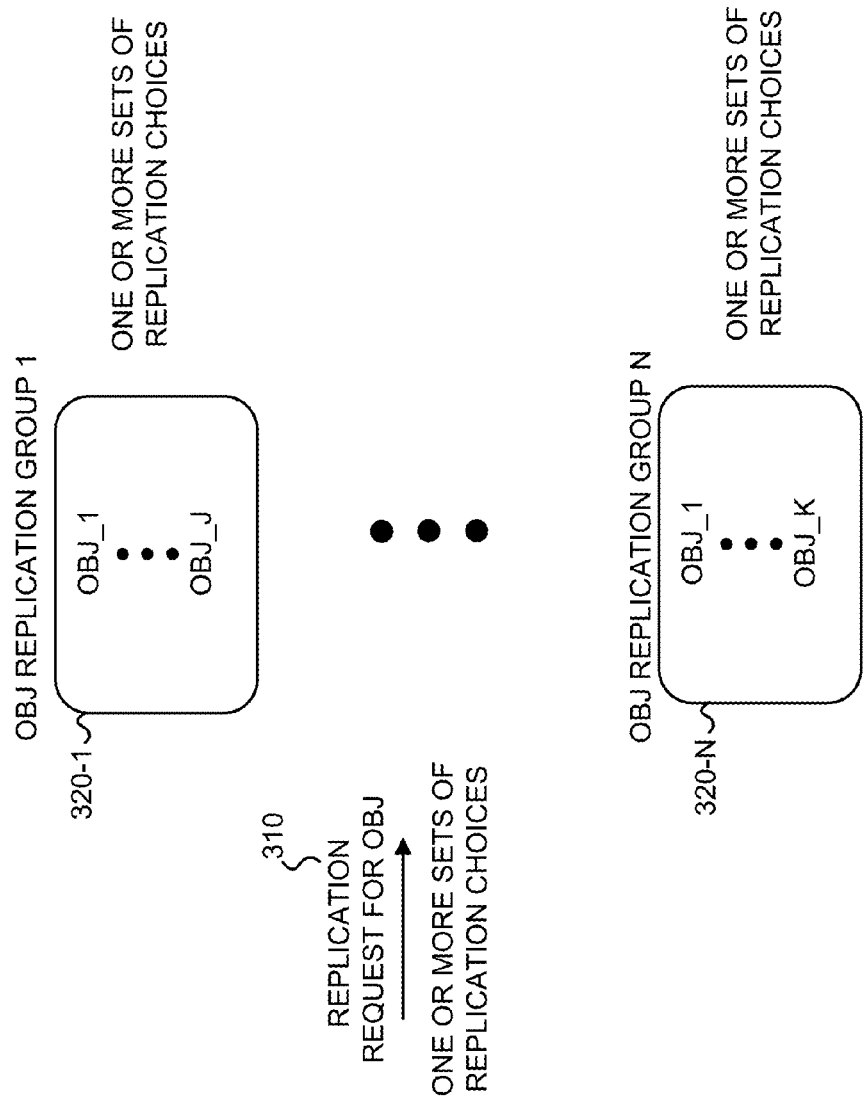
FIG. 3 is a diagram conceptually illustrating grouping of objects.

As previously mentioned, objects that are to be replicated may be organized into groups. FIG. 3 is a diagram conceptually illustrating grouping of objects.

As shown in FIG. 3, a replication request 310, which may represent an indication or command that an object is to be replicated, may be associated with one or more sets of replication choices. Each set of replication choices may include a tuple that includes an identification of, for example, the elements: source storage cluster for the replication, destination storage cluster for the replication, channel between the source and destination storage cluster, and priority of the replication. For example, a particular object may be associated with the replication choices: (SC1, SC2, C1, P1), which may indicate that the object, stored in a first storage cluster (SC1, the source storage cluster), may be replicated by copying the object to a second storage cluster (SC2, the destination storage cluster), using a first channel (C1). The replication may be associated with a priority value (P1), such that, when possible, higher priority replication requests may be processed before lower priority replication requests.

In some implementations, objects may be associated with multiple sets of replication choices. For example, an object may be associated with the sets of replication choices: [SC1, SC2, C1, P1] and [SC1, SC3, C2, P1], where SC3 may represent a third storage cluster and C2 may represent a second channel. In this case, replication of the object may be successfully performed by copying the object using either one of the sets of replication choices.

Objects, that are to be replicated, may be grouped based on the sets of replication choices for the objects. As shown in FIG. 3, N (N>0) object replication groups 320-1 through 320-N are illustrated. Each object replication group may include a number of objects. As illustrated, object replication group 320-1 includes J (J>0) objects and object replication group 320-N includes K (K>0) objects. Each object in a replication group, such as replication group 320-1, may be associated with one or more sets of replication choices and all objects in the replication group, such as replication group 320-1, are associated with the same one or more sets of replication choices. For each object replication group 320, all objects in the group may be replicated using any one of the one or more sets of replica choices for the group.

Figure 4:
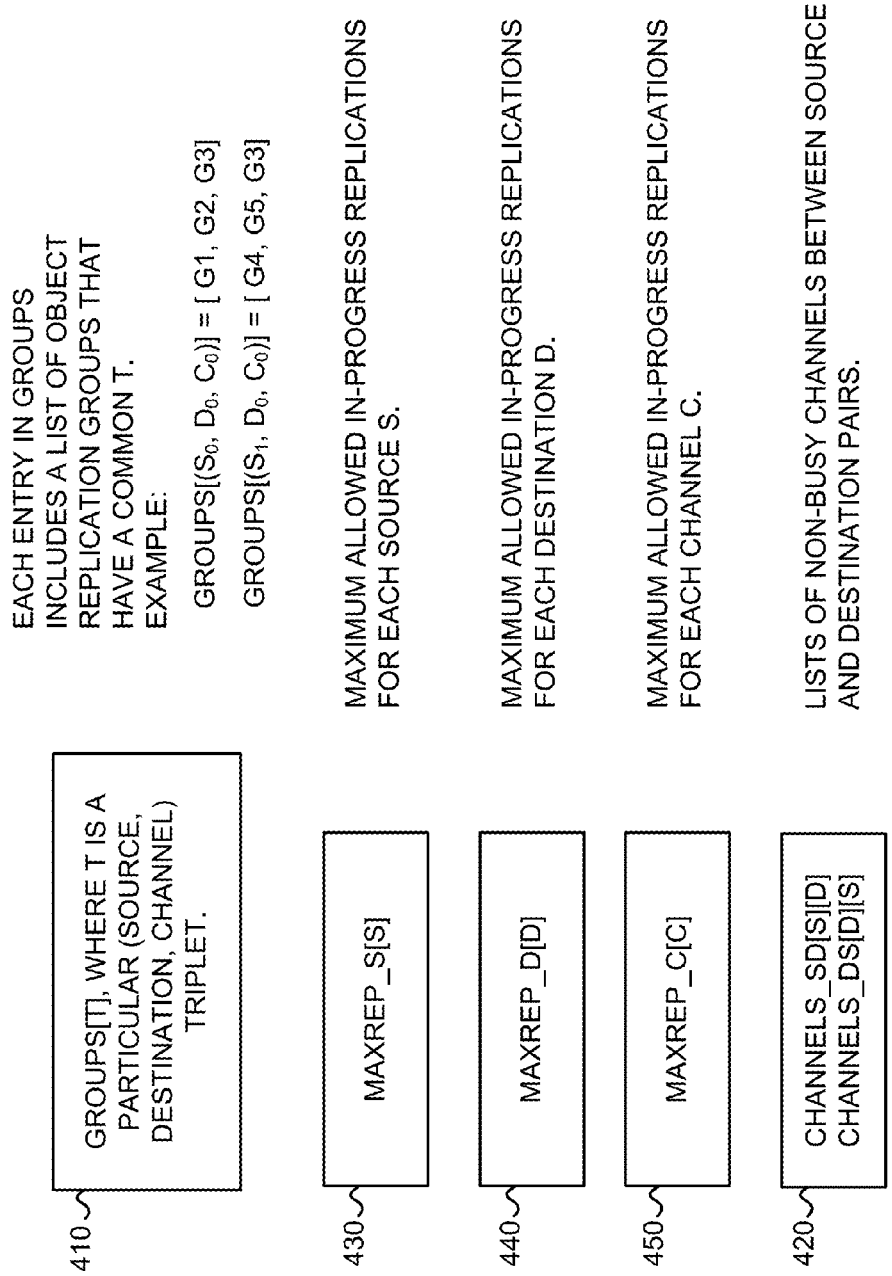
FIG. 4 is a diagram illustrating an example set of parameters and/or data structures that may be maintained by the replication scheduler shown in FIG. 2.

Replication scheduler 230 may maintain a number of parameters and/or data structures that may be used when scheduling objects for replication. FIG. 4 is a diagram illustrating an example set of parameters and/or data structures that may be maintained by replication scheduler 230.

As shown in FIG. 4, replication scheduler 230 may maintain a data structure 410, called Groups[T] herein, that maintains a list of object replication groups 320 that have a particular source cluster, destination cluster, and channel (with some value for the priority) among the set of replication choices for the group. For example, data structure 410 may include a list, indexed by T, where T is a (source cluster, destination cluster, and channel) triplet.

To define data structure 410 more formally, assume that the object replication groups 320 are represented as G[1], G[2], . . . G[N]. For each G[i], the one or more sets of replication choices available to all objects in G[i] may be Rep[i, 1], Rep[i, 2] . . . Rep[i, m], where each replication choice may be the tuple (S[i, m], D[i, m], C[i, m], P[i,m]), denoting the source cluster, destination cluster, channel between the source and destination cluster, and priority, respectively. In this situation, data structure 410, Groups[T], may represent a list where each element in the list may be indexed by the triplet T=(S, D, C) and each element may correspond to a list of groups that have a particular value for T (and some priority value). For example, Groups[($S_0$, $D_0$, $C_0$)] may correspond to a list that includes the object replication groups G1, G2, and G3; and Groups[($S_1$, $D_0$, $C_0$)] may correspond to a list that includes the object replication groups G4, G5, and G3. Because each object replication group 320 may be associated with multiple sets of replication choices, an object replication group may be included in more than one entry in Groups[T].

Each entry in Groups[T] may be sorted by the priority values of the corresponding object replication groups. Thus, for each triplet, T, the corresponding list of object replication groups may be sorted by the priority values corresponding to the set of replication choices. For the example shown in FIG. 4, for the object replication groups in Groups[($S_0$, $D_0$, $C_0$)], G1 may have a higher priority than G2, which may have a higher priority than G3. For Groups[($S_1$, $D_0$, $C_0$)], G4 may have a higher priority than G5, which may have a higher priority than G3.

Groups[T] may itself be sorted by the highest priority value corresponding to each triplet T. Thus, in the example of FIG. 4, in which Groups[($S_0$, $D_0$, $C_0$)] is listed before Groups[($S_1$, $D_0$, $C_0$)], the priority value corresponding to object replication group G1 may be higher than the priority value corresponding to object replication group G4.

Replication scheduler 230 may additionally maintain parameters relating to the maximum allowed in-progress replications for each source (S), destination (D), and channel (C). These parameters may include: MaxRep_S[S] 430, which may be a list that includes values that define the maximum allowed quantity of simultaneous in-progress replications for each source storage cluster S; MaxRep_D[D] 440, which may be a list that includes values that define the maximum allowed quantity of simultaneous in-progress replications for each destination storage cluster D; and MaxRep_C[C] 450, which may be a list that includes values that define the maximum allowed quantity of simultaneous in-progress replications for each channel C. A "busy" channel, as used herein, may refer to a channel in which the quantity of in-progress replications is equal to the corresponding value in MaxRep_C[C]. Parameters 430, 440, and 450 may be set, for example, by an administrator and/or set or modified dynamically by file system 210.

As is further shown in FIG. 4, replication scheduler 230 may additionally maintain data structures 420, which may, in some implementations, be implemented as lists that are illustrated as Channels_SD[S][D] and Channels_DS[D][S]. In some implementations, Channels_SD[S][D] and Channels_DS[D][S] may each correspond to a list of lists. Each element of Channels_SD[S][D] may correspond to, for each source (S) and destination (D) storage cluster pair, a list of non-busy channels between S and D. For each source storage cluster S, Channels_SD[S][D] may be sorted by the highest priority across all Channels_SD[S][D] for that S, where priority values may correspond to the priorities for the (S, D, C) triplets that index Groups[T]. Similarly, each element of Channels_DS[D][S] may correspond to, for each source (S) and destination (D) storage cluster pair, a list of non-busy channels between D and S. For each source storage cluster D, Channels_DS[D][S] may be sorted by the highest priority across all Channels_DS[D][S] for that D.

The parameters and/or data structures that are shown in FIG. 4 and maintained by replication scheduler 230 illustrate one example set of parameters and/or data structures. In other implementations, different, fewer, or additional parameters and/or data structures may be maintained by replication scheduler 230. Additionally, although a number of parameters and/or data structures in FIG. 4 were referred to as "lists," other types of data structures, such as dictionaries, sets, arrays, etc., could alternatively or additionally be used.

Figure 5:
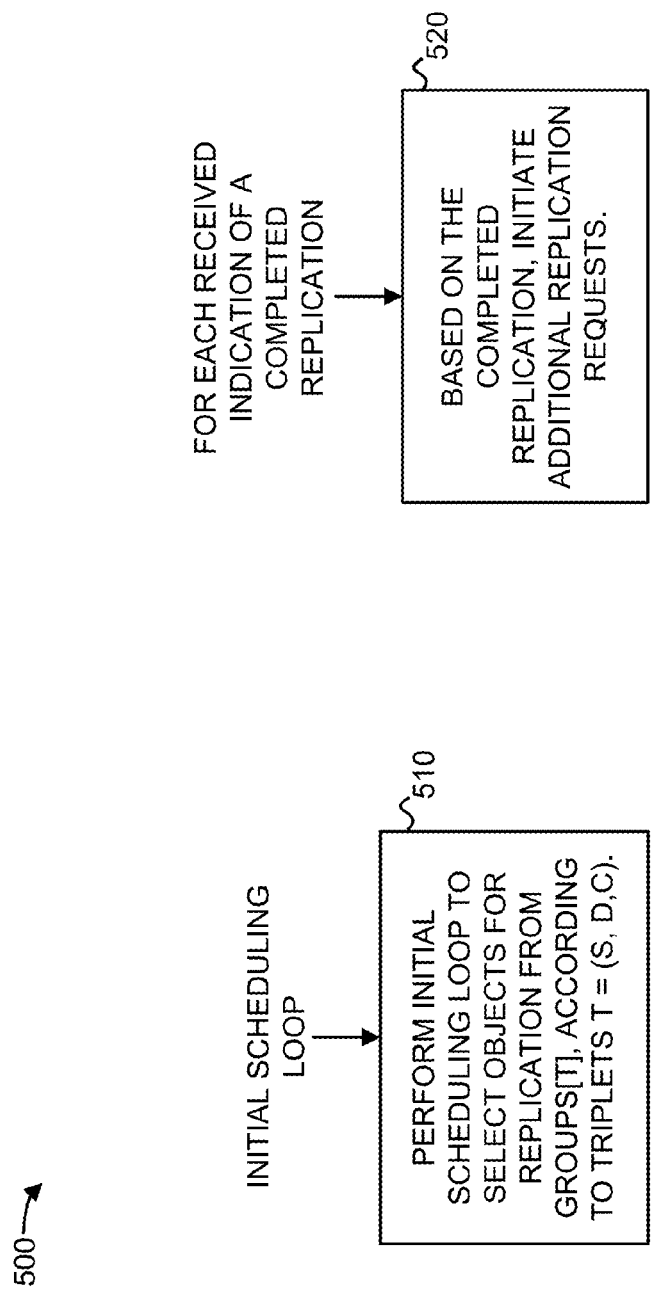
FIGS. 5, 6, 7A, and 7B are flowcharts illustrating an example process for performing object replica scheduling.

FIG. 5 is a flowchart illustrating an example process 500 for performing object replica scheduling. Process 500 may be performed by, for example, file system 210, such as replication scheduler 230.

Process 500 may serve to adaptively schedule prioritized replication requests. Process 500 may generally exhibit the following traits: (1) at any given moment of time, for any source storage cluster S, the quantity of replications in progress from S does not exceed MaxRep_S[S]; (2) at any given moment of time, for any destination storage cluster D, the quantity of replications in progress from D does not exceed MaxRep_D[D]; (3) at any given moment of time, for any channel C, the quantity of replications in progress from C doesn't exceed MaxRep_C[C]; (4) at any given moment of time, there is a replication request that can be sent for execution without violating (1)-(3), the replication request is sent; (5) if there are multiple such replications from (4), the highest priority one is sent first; and (6) the overhead, which may be defined as the average number of operations performed by replication scheduler 230 per replication executed, is bounded by a constant that does not depend on the quantity of channels in file system 210.

Process 500 may include an initial scheduling loop to select objects for replication from Groups[T] (e.g., data structure 410) according to the triplets, T=(S, D, C) (block 510). In general, the initial scheduling loop may operate to iterate through Groups[T], based on the triplets T, until the available resources of file system 210 are exhausted or until Groups[T] is empty. Block 510 will be described in more detail below with reference to FIG. 6.

Replication scheduler 230 may receive acknowledgements that indicate when a replication request has completed. Based on these indications of completed replications, additional replication requests may be initiated (block 520). Block 520 will be described in more detail below with reference to FIGS. 7A and 7B.

Figure 6:
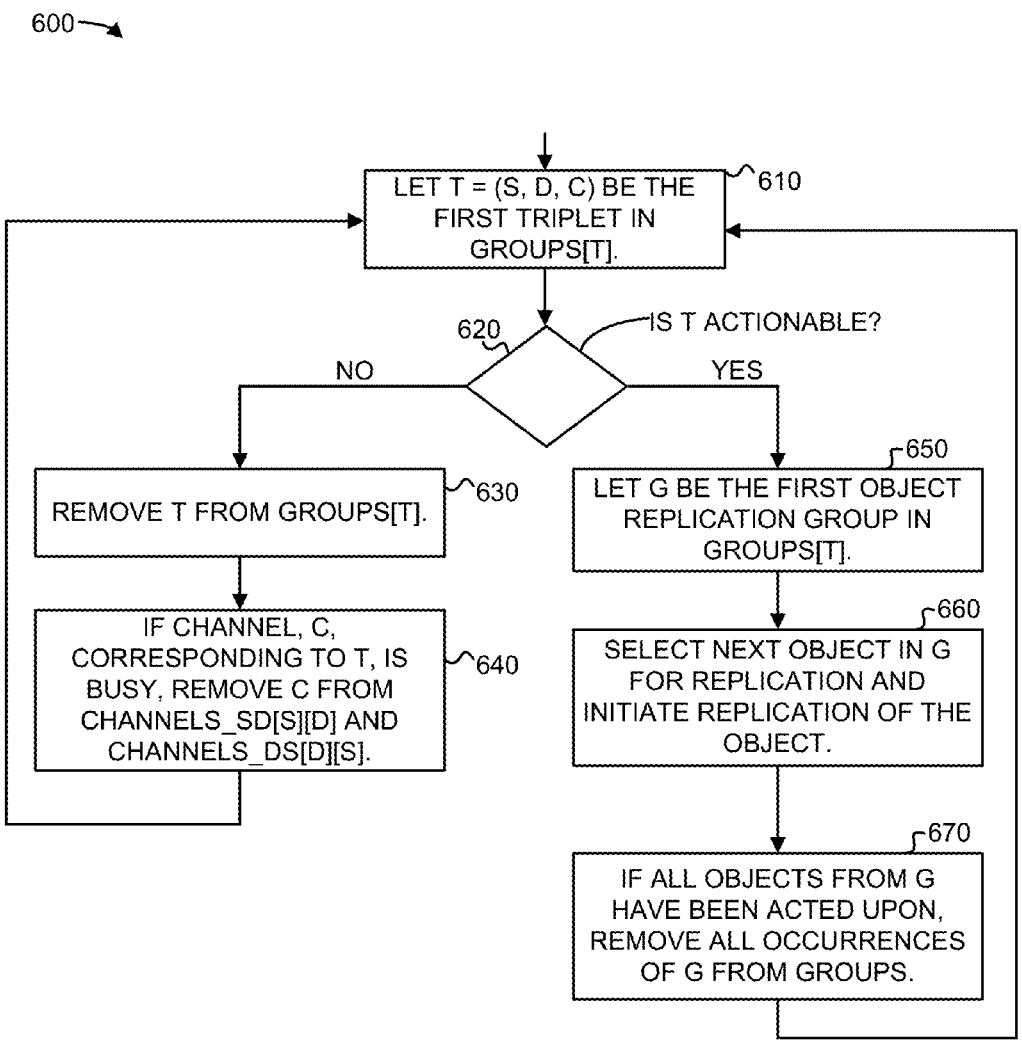

FIG. 6 is a flowchart illustrating an example process 600 for performing the initial scheduling loop (e.g., block 510 of FIG. 5).

Process 600 may include assigning a variable, T (S, D, C), to be equal to the first triplet in Groups[T] (block 610). The triplet, T, may thus correspond to the first list of object replication groups in Groups[T]. If there are no triplets remaining in Groups[T], process 600 may terminate.

An actionable triplet may be defined as one in which S, D, and C are not busy. For instance, a triplet may be actionable when the quantity of in-progress replications for S is less than or equal to MaxRep_S[S], the number of in-progress replications for D is less than or equal to MaxRep_D[D], and the quantity of in-progress replications for C is less than or equal to MaxRep_C[C]. An actionable triplet may include a triplet for which a replication request may be initiated.

Process 600 may further include determining whether T is actionable (block 620). When T is not actionable (block 620—NO), process 600 may further include removing T from the indexes of Groups[T] (block 630). Process 600 may further include, when the channel, C, corresponding to T, is busy, removing C from Channels_SD[S][D] and Channels_DS[D][S] (block 640).

When T is actionable (block 620—YES), process 600 may further include assigning a variable, G, to the first object replication group in Groups[T] (block 650). The next object in G may be selected for replication and replication of the object may be initiated (block 660). Initiating replication of the object may include, for example, transmitting a replication command to one or more storage clusters 220. For example, replication scheduler 230 may transmit a replication request message, corresponding to the selected object, to the storage cluster 220 that corresponds to the source storage cluster for the object. The source and destination storage clusters 220 may then communicate with one another to perform the object replication. Replication scheduler 230 may receive an acknowledgment indicating whether the replication succeeds or fails.

Process 600 may further include, if all the objects in G have been acted upon, removing all occurrences of G from Groups [T] (block 670). In this situation, there are no more objects to replicate in G.

Figure 7A:
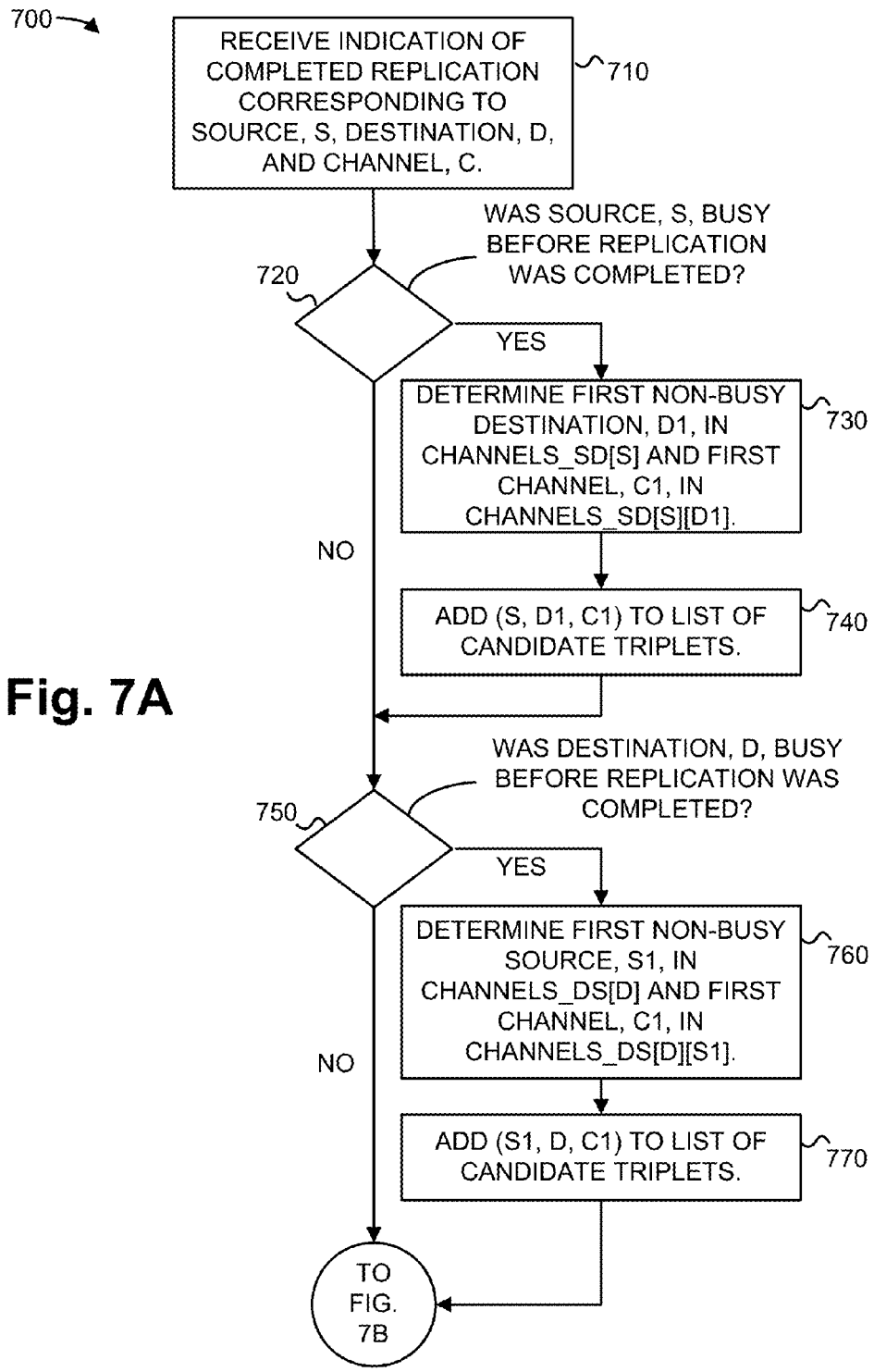
Figure 7B:
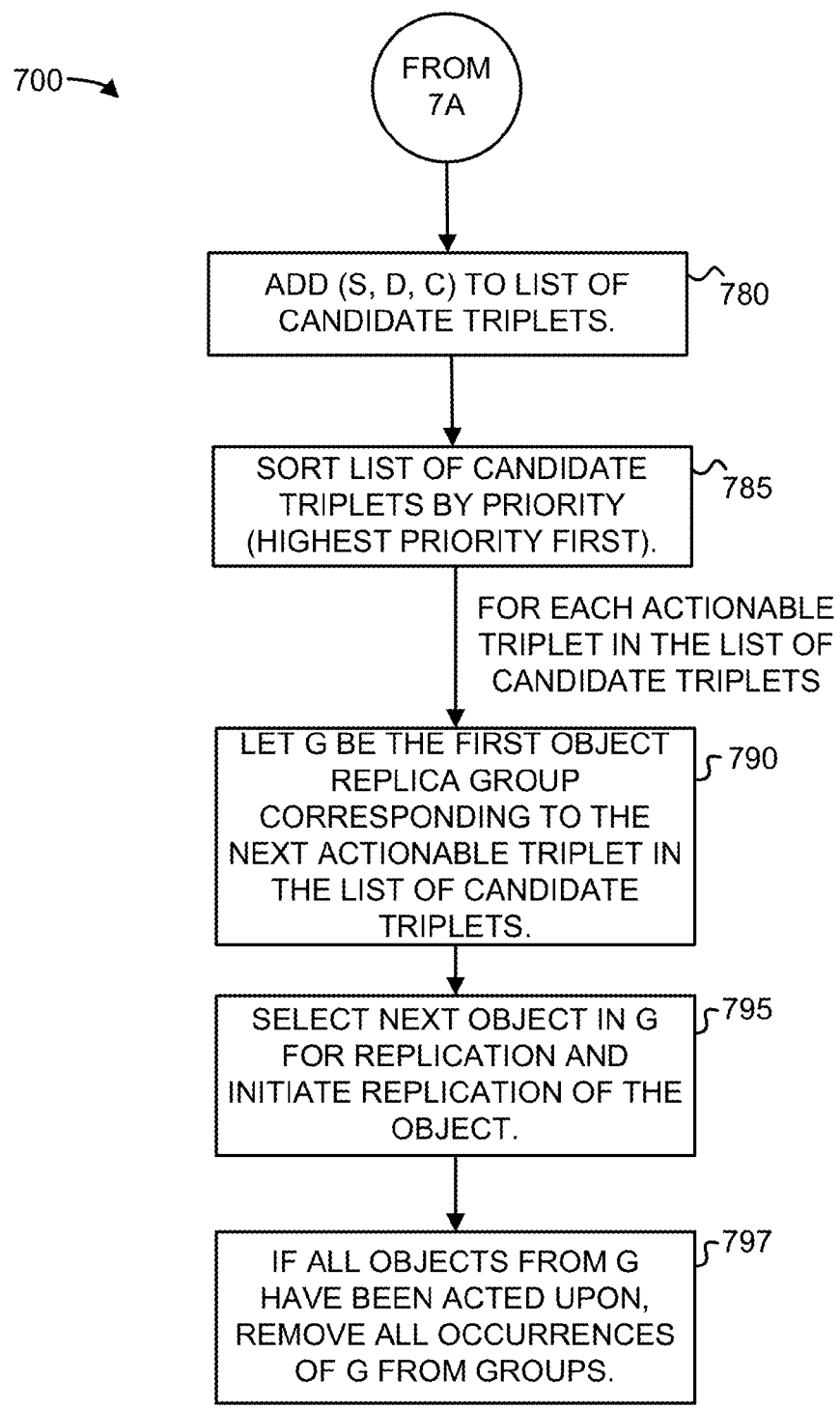

FIGS. 7A and 7B are flowcharts illustrating an example process 700 for initiating replication requests in response to the indications that replications have been completed (e.g., block 520 in FIG. 5).

Process 700 may include receiving an indication of a completed replication, corresponding to source storage cluster S, destination storage cluster D, and channel C (block 710). Process 700 may further include determining whether the source storage cluster, S, was busy before the replication was completed (block 720). The source storage cluster, S, may be busy when the number of pending replications, from S, are equal to MaxRep_S[S].

When the source storage cluster, S, is determined to be busy (block 720—YES), process 700 may further include determining the first non-busy destination, D1, in Channels_SD[S], and the first channel, C1, in Channels_SD[S] [D1](block 730). The triplet corresponding to (S, D1, C1) may then be added to a list of candidate triplets (block 740). In some implementations, if all the destinations are busy in Channels_SD[S], block 740 may be skipped.

Process 700 may further include determining whether the destination storage cluster, D, was busy before the replication was completed (block 750). When the destination storage cluster is determined to be busy (block 750—YES), process 700 may further include determining the first non-busy source, S1, in Channels_DS[D], and the first channel, C1, in Channels_DS[D][S1] (block 760). The triplet corresponding to (S1, D, C1) may then be added to the list of candidate triplets (block 770). In some implementations, if all the sources are busy in Channels_DS[D], block 770 may be skipped.

Referring to FIG. 7B, process 700 may further include adding the triplet, corresponding to the completed replication request (S, D, C) to the candidate list (block 780). The candidate triplet list, which was created in blocks 740, 770, and 780, may be sorted by priority (block 785). In some implementations, the sorting may be performed in a manner similar to the sorting of the triplets for Groups[T], in which the triplets, in a candidate list, may be sorted by the priority values of the corresponding object replication groups. Thus, for each triplet, the sorting may be based on the highest priority object replication group that corresponds to the triplet. The sorting may be performed so that the highest priority triplet is first in the sorted candidate list.

Process 700 may further include performing, for each actionable triplet in the list of candidate triplets, blocks 790, 795, and 797. In particular, process 700 may further include assigning a variable, G, to the first object replication group corresponding to the next actionable triplet in the list of candidate triplets (block 790). Process 700 may include selecting the next object in G and initiating replication of the object (block 795). As previously mentioned, initiating replication of the object may include, for example, transmitting a replication command to one or more storage clusters 220. Process 700 may further include, if all the objects in G have been acted upon, removing all occurrences of G from the object replication groups corresponding to the list of candidate triplets (block 797).

Figure 8:
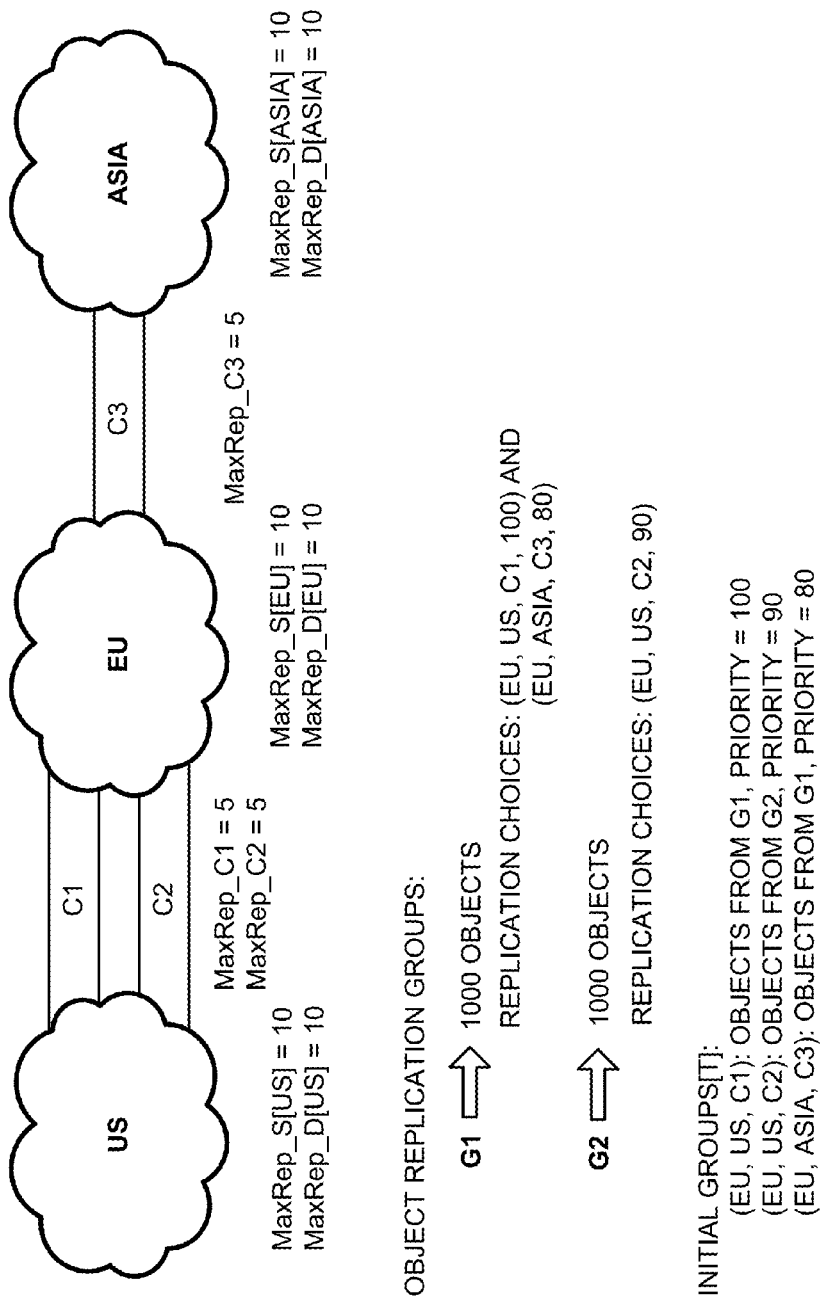
FIG. 8 is a diagram conceptually illustrating an example of replication scheduling.

FIG. 8 is a diagram conceptually illustrating replication scheduling, as described above, as applied to example object replication groups. As shown, assume that three storage clusters, labeled US, EU, and ASIA, are included in a file system. Two channels are present between EU and US, labeled as C1 and C2. One channel is present between EU and ASIA, labeled as channel C3. Further, assume each storage cluster can act as both a source storage cluster and a destination storage cluster, and each storage cluster can be a source for up to ten replication operations and can be a destination for up to ten replication operations. Further, as shown, each channel has a maximum capacity of up to five replication operations.

Two example object replication groups are also illustrated in FIG. 8. Object replication group G1 may include 1000 objects that are to be replicated. Each of these objects may be replicated using either the set of replication choices (EU, US, C1, 100) or (EU, ASIA, C3, 80). In other words, for G1, the objects in G1 are to be copied from the EU storage cluster to either the US storage cluster, using channel C11, or the ASIA storage cluster, using channel C3. Object replication group G2 may also include 1000 objects that are to be replicated. Each of these objects may be replicated using the set of replication choices (EU, US, C2, 90). In other words, for G2, the objects in G2 are to be copied from the EU storage cluster to the US storage cluster, using channel C2.

Based on the object replication groups, Groups[T] may include three triplets, T. These triplets may include: (EU, US, C1), which corresponds to the objects in G1; (EU, US, C2), which corresponds to the objects in G2; and (EU, ASIA, C3), which corresponds to the objects in G1. As illustrated, the triplets in Groups[T] are sorted by the corresponding priority values.

The initial scheduling loop (FIG. 5, block 510; and FIG. 6) results in the scheduling of five replication requests, from G1, over C1. At this point, C1 will be at its maximum capacity. The initial scheduling loop may then further schedule five replication requests, from G2, over C2. At this point, the source storage cluster, EU, will be at its maximum capacity and no further replication requests may be scheduled until a replication request completes.

When the replication operations over C1 and C2 complete, the replication completion operation (FIG. 5, block 520; and FIGS. 7A and 7B) will start a new replication over C1 and C2, respectively. Accordingly, a steady state condition with five replications in progress over C1 and C2 will be reached.

Assume that each replication request takes one second to complete. After 500 seconds, there will be 500 objects left unprocessed in G1 and G2. Assume that at this point the throughput of C1 drops by 50% so that all subsequent replications over C1 will take two seconds each. In the next 100 seconds, there may be 250 objects left in G1 while all of the objects in G2 may be processed. The replication completion operation (FIG. 5, block 520; and FIGS. 7A and 7B) for the last five replications over C2 will launch new replications for G1 objects over C3. At this point, the remaining 250 G1 replications may be divided between C1 and C3 in a 1:2 proportion (due to the different throughputs of C1 and C3).

Computing Device Overview

Figure 9:
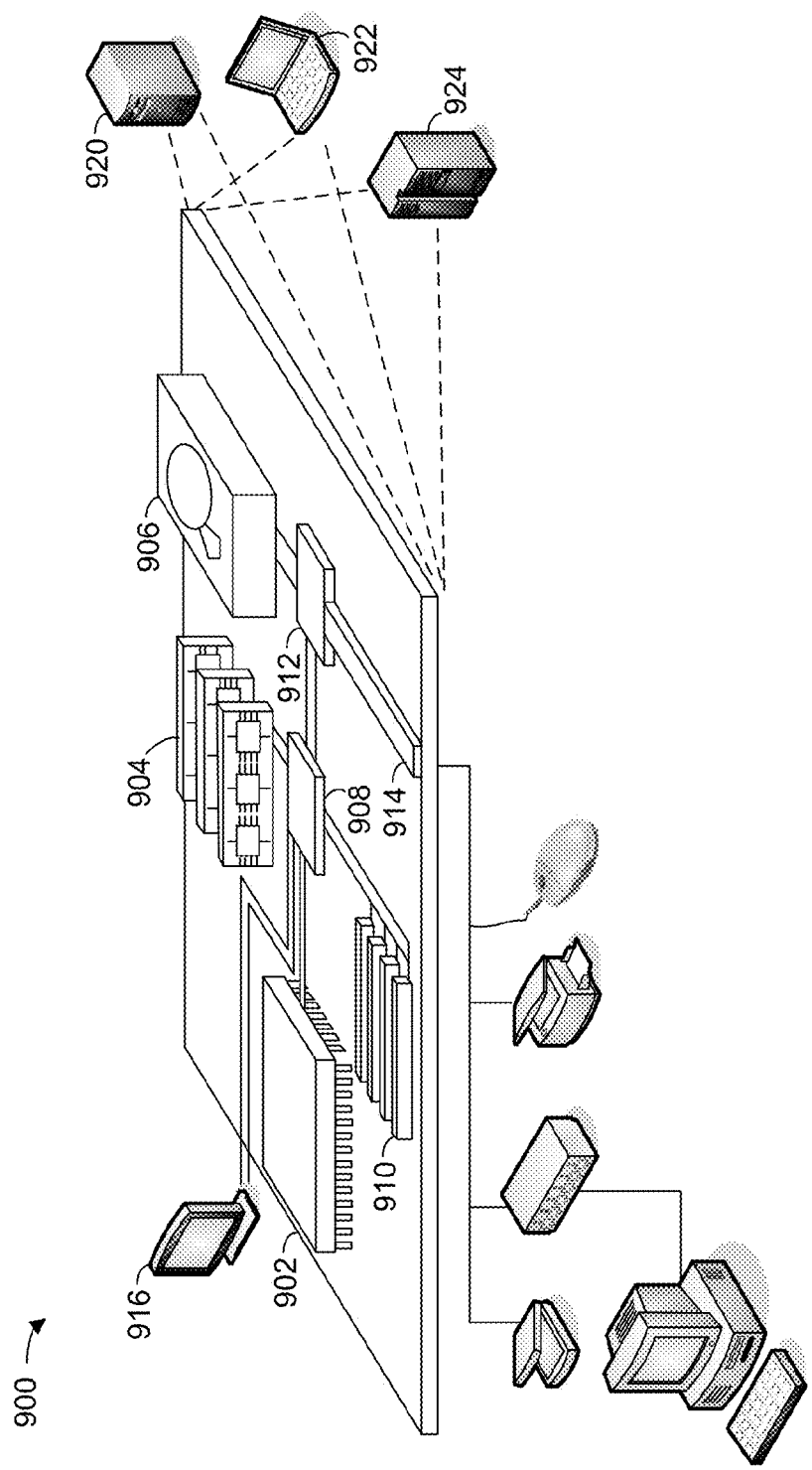
FIG. 9 is a diagram illustrating an example of a generic computing device.

FIG. 9 shows an example of a generic computing device 900, which may be used with the techniques described herein. Computing device 900 may correspond to, for example, a device used in file system 210, storage cluster 220, and/or replication scheduler 230. In some implementations, multiple computing devices 900 may be used to implement file system 210, storage cluster 220, and/or replication scheduler 230.

Computing device 900 is intended to represent various forms of digital computers, such as laptops, desktops, workstations, personal digital assistants, servers, blade servers, mainframes, and other appropriate computers. The components shown here, their connections and relationships, and their functions, are meant to be examples only, and are not meant to limit implementations described and/or claimed in this document.

Computing device 900 may include a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, may be interconnected using various busses, and may be mounted on a common motherboard or in other manners as appropriate. Processor 902 may process instructions for execution within computing device 900, including instructions stored in the memory 904 or on storage device 906 to display graphical information for a graphical user interface (GUI) on an external input/output device, such as display 916 coupled to high speed interface 908. In another implementation, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system, etc.).

Memory 904 may store information within computing device 900. In one implementation, memory 904 may include a volatile memory unit or units. In another implementation, memory 904 may include a non-volatile memory unit or units. Memory 904 may also be another form of computer-readable medium, such as a magnetic or optical disk. A computer-readable medium may be defined as a non-transitory memory device. A memory device may include memory space within a single physical memory device or spread across multiple physical memory devices.

Storage device 906 may provide mass storage for computing device 900. In one implementation, storage device 906 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 904, storage device 906, or memory included within processor 902.

High speed controller 908 may manage bandwidth-intensive operations for computing device 900, while low speed controller 912 may manage lower bandwidth-intensive operations. Such allocation of functions is an example only. In one implementation, high-speed controller 908 may be coupled to memory 904, display 916 (e.g., through a graphics processor or accelerator), and to high-speed expansion ports 910, which may accept various expansion cards (not shown). In the implementation, low-speed controller 912 may be coupled to storage device 906 and to low-speed expansion port 914. Low-speed expansion port 914, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 900 may be implemented in a number of different forms, as shown in FIG. 9. For example, it may be implemented as a standard server 920, or multiple times in a group of such servers. It may also be implemented as part of a rack server system 924. Additionally or alternatively, computing device 900 may be implemented in a personal computer, such as a laptop computer 922.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 9 shows example components of computing device 900, computing device 900 may include fewer components, different components, additional components, or differently arranged components than depicted in FIG. 9. Additionally or alternatively, one or more components of computing device 900 may perform one or more tasks described as being performed by one or more other components of computing device 900.

The foregoing description provides illustration and description, but is not intended to be exhaustive or to limit the implementations to the precise form disclosed. Modifications and variations are possible in light of the above disclosure or may be acquired from practice of these implementations.

For example, while series of blocks have been described with regard to FIGS. 5, 6, 7A and 7B, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more devices, the method comprising:
   maintaining, by at least one of the one or more devices, a plurality of groups of objects, each group including one or more objects associated with priority values and that are to be replicated at one or more storage clusters of a plurality of storage clusters, each group, of the plurality of groups, being associated with a set of replication choices describing how the objects in the group are to be replicated, and the set of replication choices including information defining at least a
   source storage cluster, a destination storage cluster, or a channel between the source storage cluster and the destination storage cluster;
   associating, by at least one of the one or more devices, maximum sending capacity values with the plurality of storage clusters;
   associating, by at least one of the one or more devices, maximum receiving capacity values with the plurality of storage clusters;
   associating, by at least one of the one or more devices, a group priority value with each of the plurality of groups, the group priority value being selected as a highest priority value associated with the one or more objects in each of the plurality of groups;
   scheduling, by at least one of the one or more devices, the one or more objects for replication in a replication order based at least in part on the group priority values, the maximum sending capacity values, and the maximum receiving capacity values; and
   initiating, by at least one of the one or more devices, replication of the one or more objects based on the scheduled replication order.

2. The method of claim 1, further comprising:
   associating maximum channel capacity values with channels between the source storage clusters and the destination storage clusters,
      where scheduling the one or more objects for replication is based additionally on the maximum channel capacity values.

3. The method of claim 1, further comprising:
   receiving confirmation that the initiated replication has completed;
   forming, based on the source storage cluster and the destination storage cluster corresponding to the completed replication, a list of candidate source storage cluster, destination storage cluster, and channel triplets; and
   scheduling, based on the list, additional objects of the one or more objects for replication.

4. The method of claim 1, where at least some of the one or more objects are associated with a plurality of sets of replication choices, the method further comprising:
   including the at least some of the one or more objects in multiple ones of the plurality of groups of objects.

5. A system comprising:
   a plurality of storage clusters to store a plurality of objects; and
   one or more computing devices to schedule replication of the plurality of objects, corresponding to priority values, among the plurality of storage clusters, replication of each of the plurality of objects being associated with one or more sets of replication choices that define replication parameters for the plurality of objects, the one or more computing devices to:
      assign the plurality of objects to a plurality of groups based on the replication choices for the plurality of objects, at least some of the plurality of objects being assigned to multiple groups in the plurality of groups;
      determine priority values, associated with each of the plurality of groups, the priority value of a particular group, of the plurality of groups, being determined based on the priority values associated with objects within the particular group;

select objects, from the plurality of objects, for replication, in a replication order based on the priority values of the plurality of groups; and initiate replication of the selected objects by the plurality of storage clusters.

6. The system of claim 5, where the one or more computing devices are further to: associate maximum sending capacity values with the plurality of storage clusters; associate maximum receiving capacity values with the plurality of storage clusters; and where selecting the objects, from the plurality of objects, for replication, are performed in a replication order that is additionally based on the maximum sending capacity values and the maximum receiving capacity values.

7. The system of claim 5, where one or more channels couple the plurality of storage clusters to one another, the one or more computing devices are further to:

associate maximum channel capacity values with the one or more channels; and where selecting the objects, from the plurality of objects, for replication, are performed in a replication order that is additionally based on the maximum channel capacity values.

8. The system of claim 7, where the one or more computing devices are further to:

determine the priority value of the particular group as a highest priority value associated with all the objects within the particular group.

9. The system of claim 5, where the one or more computing devices are further to:

sort the plurality of groups based on the determined priority values; and where selecting the objects for replication is based additionally on the sorted plurality of groups.

10. The system of claim 5, where the one or more computing devices are further to:

form the plurality of groups based on common source storage cluster, destination storage cluster, and channel triplets that are associated with the plurality of objects.

11. The system of claim 5, where the one or more computing devices are further to: receive confirmation that an initiated replication, of a selected object, has completed; form, based on a source storage cluster and a destination storage cluster corresponding to the selected object, a list of candidate source storage cluster, destination storage cluster, and channel triplets; and where the selecting, based on the list, additional includes selecting ones of the plurality of objects for replication.

12. The system of claim 11, where the storage clusters are geographically distributed.

13. A method performed by one or more devices, the method comprising:

maintaining, by at least one of the one or more devices, a plurality of groups of objects, each group, of the plurality of groups, including one or more objects, associated with priority values and that are to be replicated at one or more storage clusters in a plurality of storage clusters, replication of each of the plurality of objects being associated with one or more sets of replication choices that define replication parameters for the plurality of objects;

assigning, by at least one of the one or more devices, the plurality of objects to a plurality of groups based on the replication choices for the plurality of objects, at least some of the plurality of objects being assigned to multiple groups of the plurality of groups;

determining, by at least one of the one or more devices, priority values associated with each of the plurality of groups, the priority value of a particular group, of the plurality of groups, being determined based on priority values associated with objects within the particular group:

selecting, by at least one of the one or more devices, objects, from the plurality of objects, for replication, in a replication order based on the priority values of the plurality of groups; and initiating, by at least one of the one or more devices, replication of the selected objects by the plurality of storage clusters.

14. The method of claim 13, further comprising:

associating maximum sending capacity values with the plurality of storage clusters;

associating maximum receiving capacity values with the plurality of storage clusters;

and where selecting the objects, from the plurality of objects, for replication, are performed in a replication order that is additionally based on the maximum sending capacity values and the maximum receiving capacity values.

15. The method of claim 14, where one or more channels couple the plurality of storage clusters to one another, the method further comprising:

associating maximum channel capacity values with the one or more channels; and where selecting the objects, from the plurality of objects, for replication, are performed in a replication order that is additionally based on the maximum channel capacity values.

16. The method of claim 13, further comprising:

determining the priority value of the particular group as a highest priority value associated with all the objects within the particular group.

17. The method of claim 13, further comprising:

sorting the plurality of groups based on the determined priority values; and where selecting the objects for replication is based additionally on the sorted plurality of groups.

18. The method of claim 13, further comprising:

forming the plurality of groups based on common source storage cluster, destination storage cluster, and channel triplets that are associated with the plurality of objects.

19. The method of claim 13, further comprising:

receiving confirmation that an initiated replication, of a selected object, has completed;

forming, based on a source storage cluster and a destination storage cluster corresponding to the selected object, a list of candidate source storage cluster, destination storage cluster, and channel triplets; and where the selecting, based on the list, additional includes ones of the plurality of objects for replication.

20. The method of claim 13, where the storage clusters are geographically distributed.

21. One or more non-transitory computer-readable media, comprising:

one or more instructions that, when executed by a processor of a device, cause the processor to:

maintain a plurality of groups of objects, each group including one or more objects associated with priority values and that are to be replicated at one or more storage clusters of a plurality of storage clusters, each group, of the plurality of groups, being associated with a set of replication choices describing how the objects in the group are to be replicated, and the set of replication choices including information defining at least a source storage cluster, a destination storage cluster, or a channel between the source storage cluster and the destination storage cluster, associate maximum sending capacity values with the plurality of storage clusters, associate maximum receiving capacity values with the plurality of storage clusters, associate a group priority value with each of the plurality of groups, the group priority value being selected as a highest priority value associated with the one or more objects in each of the plurality of groups, schedule the one or more objects for replication in a replication order based at least in part on the group priority values, the maximum sending capacity values, and the maximum receiving capacity values, and initiate replication of the one or more objects based on the scheduled replication order.

* * * * *